United States Patent [19]

Bergstrom

[11] 4,028,796

[45] June 14, 1977

[54] METHOD OF MAKING A BLAST JOINT

[76] Inventor: Arthur Everett Bergstrom, 5410 Bergstrom Lane, Houston, Tex. 77088

[22] Filed: June 23, 1976

[21] Appl. No.: 699,194

Related U.S. Application Data

[62] Division of Ser. No. 600,616, July 31, 1975.

[52] U.S. Cl. .............................. 29/416; 29/455 R; 138/155; 166/243; 285/333; 285/390
[51] Int. Cl.² .......................................... B23P 17/00
[58] Field of Search ................... 29/412, 416, 455; 166/243; 277/32; 285/390, 333; 138/155

[56] References Cited

UNITED STATES PATENTS

| | | | |
|---|---|---|---|
| 2,196,966 | 4/1940 | Hammer | 285/390 X |
| 2,476,656 | 7/1949 | Galbraith | 285/390 X |
| 2,772,899 | 12/1956 | Evans | 285/390 X |
| 2,925,097 | 2/1960 | Duesterberg | 285/390 |
| 2,966,872 | 1/1961 | Schmocker | 29/416 UX |
| 2,998,848 | 9/1961 | Wright et al. | 166/243 X |
| 3,382,929 | 5/1968 | Plunk | 166/243 X |
| 3,382,930 | 5/1968 | Ribb et al. | 166/243 X |
| 3,654,691 | 4/1972 | Wilhite et al. | 29/455 X |
| 3,904,211 | 9/1975 | Dega | 277/32 |

*Primary Examiner*—Charlie T. Moon
*Attorney, Agent, or Firm*—Johnson, Dienner, Emrich & Wagner

[57] ABSTRACT

The present application discloses and claims the method of producing a blast joint for oil well production tubing. The method disclosed and claimed herein relates to assembling, upon the exterior of a length of production tubing, a stack of short length refractory rings resistant to abrasion and capable of enduring high temperature, to be used in a string of oil well production tubing.

7 Claims, 11 Drawing Figures

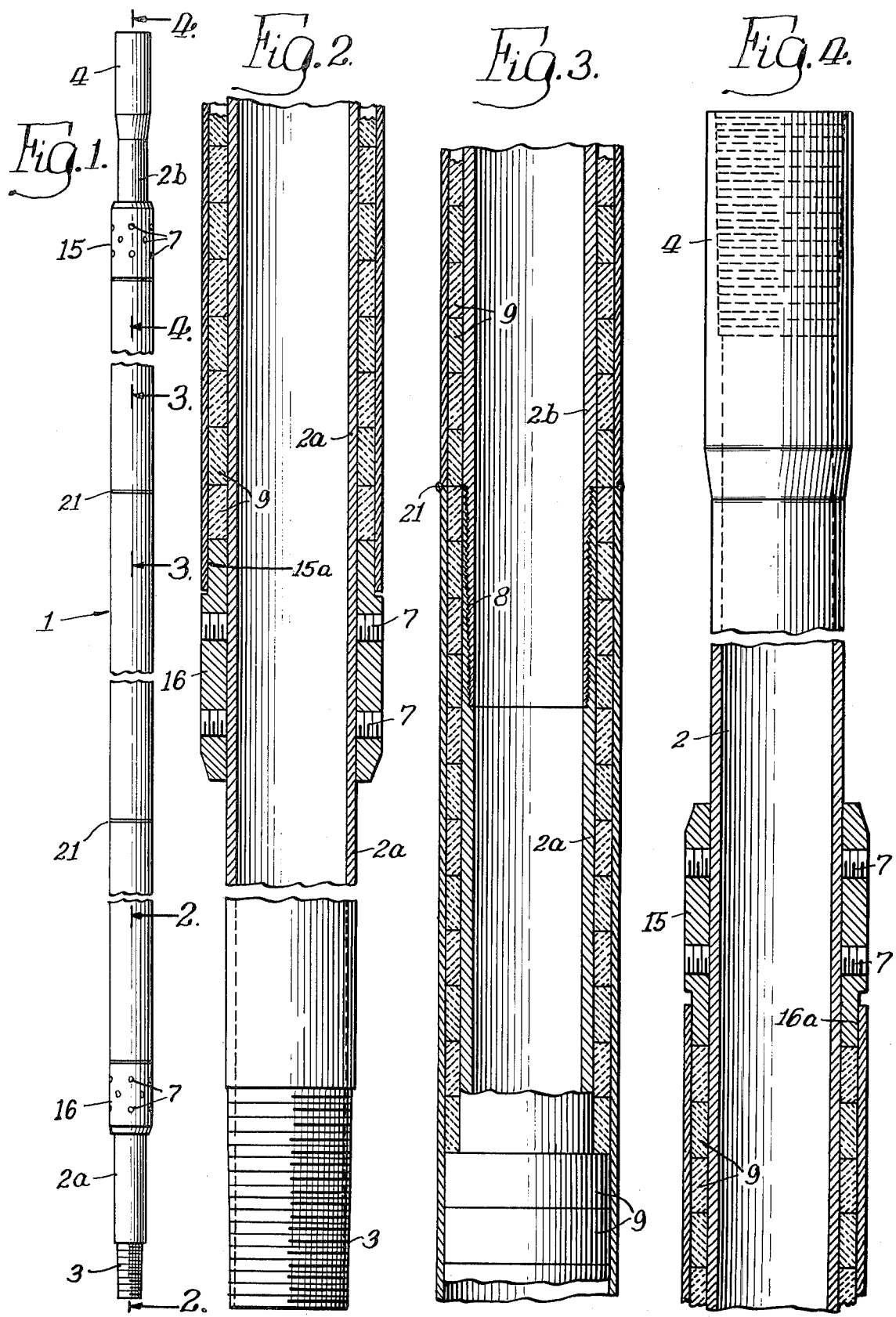

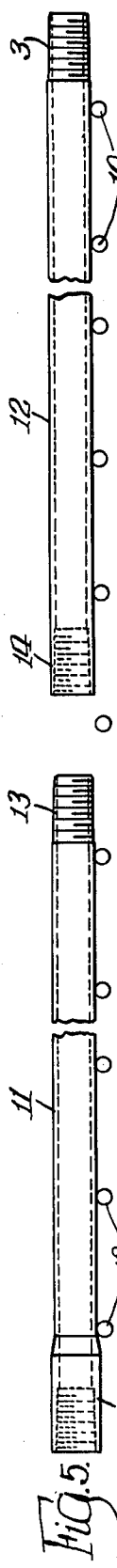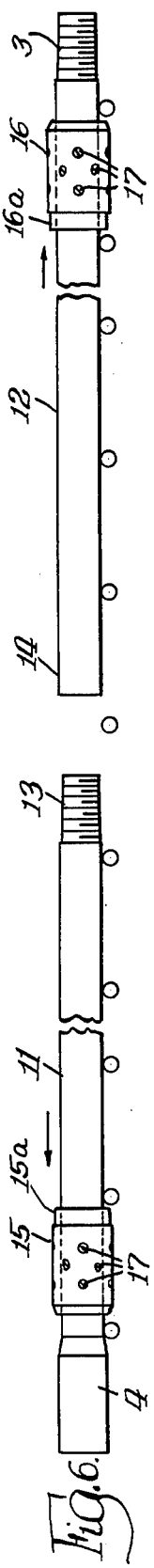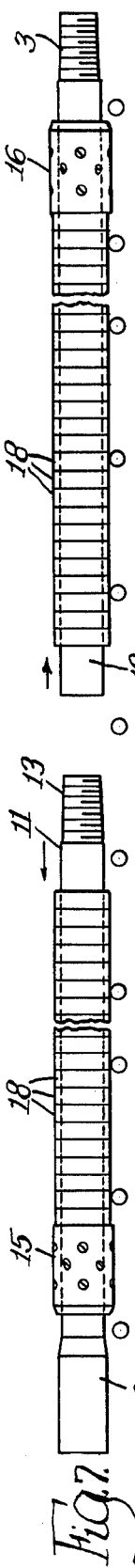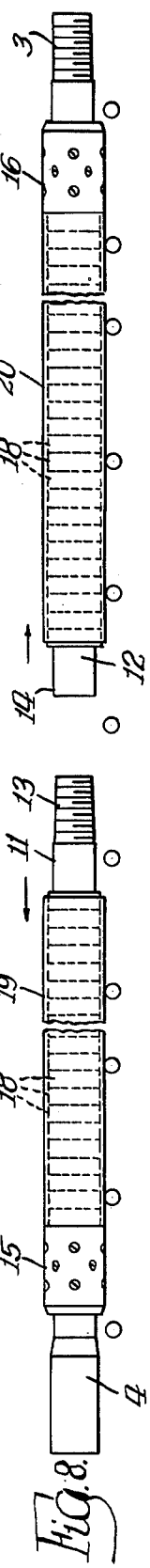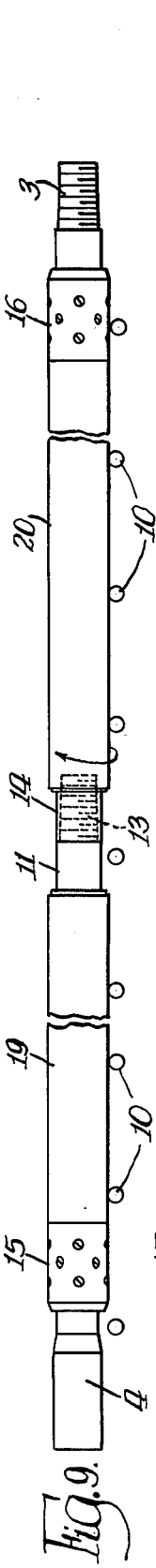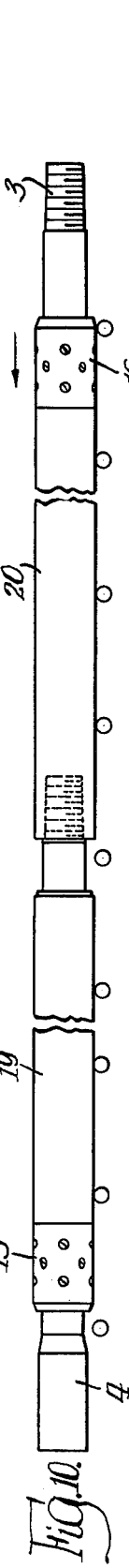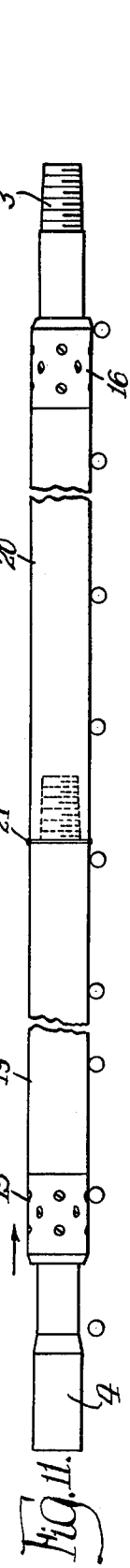

METHOD OF MAKING A BLAST JOINT

This application is a Division of co-pending application Ser. No. 600,616, filed July 31, 1975.

BRIEF SUMMARY OF THE INVENTION

The method of the present invention involves utilizing a length of tubing [preferably of standard length] with an internal threaded box joint at one end and an externally threaded pin joint on the other end, so that the completed article may be fitted in a string of production tubing. The method disclosed in detail and claimed herein involves the utilization of a highly refractory sheathing resistant to abrasion and high temperature, subdivided into short lengths constructed of a material such as tungsten carbide to be highly resistant to abrasion and high temperature and to be mounted on the production tubing in such manner as to allow joining the blast joint of the present invention in a string of production tubing subjected to abrasion, and in the finished article being of sufficient flexibility to permit handling and connecting in a production string without fracture of the protective rings.

DESCRIPTION OF THE DRAWINGS

In the attached drawings:

FIG. 1 is a side elevational view [with parts broken away] of a blast tube constructed according to the method of the present invention;

FIG. 2 is a vertical longitudinal axial section on a larger scale taken on the line 2—2 of FIG. 1; the pin end of the sections shown in FIGS. 1 and 2 is upset for a short distance above the threads;

FIG. 3 is a similar axial longitudinal vertical section on the line 3—3 of FIG. 1;

FIG. 4 is a similar vertical longitudinal axial section taken on the line 4—4 of FIG. 1;

FIG. 5 is a side elevational view of a horizontal API tubing section divided into two parts supported on cross bars of a rack and prepared and threaded for a flush joint;

FIG. 6 is a side elevational view of the two parts shown in FIG. 5 having the end retainer rings passed over the corresponding two sections of tubing toward their outer ends;

FIG. 7 is a similar side elevational view showing the two sections with carbide rings passed over the tubing sections and extended to the respective retainer rings;

FIG. 8 is a similar side elevational view showing the sheath pipe sections telescoped over the corresponding carbide rings;

FIG. 9 is a similar side elevational view at the stage where the protective metal sheathing has been telescoped over the carbide rings and the two sections of the sheathing are being secured together at the flush joint;

FIG. 10 shows the movement of the retainer rings and the refractory rings, inside of the protective sleeve 20, slid along the tube section 12 to the flush joint between tube sections, and FIG. 11 illustrates the final step of moving the left hand section of the joint including the rings, the protective sleeve 19, and clamp 15 to the right to abut the tube section 20 whereupon the end clamps 15 and 16 are fastened by grub screws to the tube sections 11 and 12 and the meeting edges of the protective sleeves 19 and 20 are joined by a peripheral weld 21. The product of the successive steps above outlined is a finished blast join shown in FIGS. 1–4, inclusive, and described and claimed in my copending application.

DESCRIPTION OF THE PREFERRED EMBODIMENT

The blast joint shown in FIG. 1 in side elevation, with parts of its length broken away, comprises the central tube 2 which is continuous from end-to-end. It has at its lower end, as shown particularly in FIG. 1, a threaded pin join 3 and at the opposite end a threaded box joint 4. The tube 2 which extends from end-to-end is initially formed of two sections 2a and 2b joined by a flush joint. (See FIGS. 3 and 5–11). Clamping collars 15 and 16 are of an internal diameter of a size to fit snugly on the external cylindrical surface of the central tubing 2a. A series of Allen head set screws 17 are seated in threaded holes in the collars 15 and 16 and are designed to grip tubing 2 or release the same under the conditions hereafter explained. These collars 15, 16 are of an internal diameter less than that of the box joint 4. With the set screws 17 released, the corresponding collars may be slid endwise of the tube 2 over the ends 13, 14 so that they may be properly positioned adjacent the outer ends of the units 11 and 12. The threads on the pin joint 3 match the threads in the box joint 4. The central part of the tube 2 includes the flush joint 8 (FIG. 3) which is made up tight to prescribed torque by the application of pipe wrenches of suitable length and predetermined loading. Segments 11 and 12 are formed by cutting a standard length of tubing into two parts of unequal length (the drawings being diagrammatic) and forming the threaded pin 13 and threaded socket 14 on the adjacent ends. With the two parts thus separated, the next step is illustrated in FIG. 6. It consists in mounting upon each of the two parts of tube clamping sleeves 15 and 16. Each of these sleeves includes a group of set screws contained in the walls of the collars 15 and 16.

As shown in FIG. 7 a series of carbide rings fitting on the tube section are slid over the adjacent ends of the tube sections 11 and 12. These rings 18 fit snugly on the corresponding tube portions and abut against the retainer rings 15 and 16 leaving a free space at the center for the pin threads 13 and box threads 14 on tube sections 11 and 12 separated sufficiently to allow the outer protecting metal sleeves 19 and 20 to be telescoped over the corresponding group of rings on each of the tube segments 11 and 12. The arrows on FIG. 7 indicate the direction of application of the rings 18 and the movement of rings 18 endwise of the tube segments 11 and 12, as also indicated by the arrows in FIG. 8.

At this stage of the assembly the clamping rings 15, 16 will have been moved outwardly towards the outer or remote ends of the tube segments and the protective rings 18 are pressed against the clamping rings 15, 16 towards the outward ends of the tube segments to provide a clear space at the center for applying the protective sleeves 19 and 20 over the two sets of rings 18, 18 and to abut them against the clamping sleeves 15 and 16 as shown in FIG. 8. The clamping screws 17, 17 hold the sleeves 15, 16 firmly to the underlying tube segments and the clamping rings hold the rings together axially.

At this stage, the tube segments 11 and 12 are brought endwise towards each other as shown in FIG. 9 to screw thread the pin 13 and box or socket 14 together into a flush joint. The two parts 11 and 12 are thereby united and assume the position shown in FIG. 9. The pin end 13 is threaded into the socket 14 making a flush joint, the two parts 13 and 14 being screwed together under predetermined torque by the use of suitable pipe wrenches. When the tapered pin and socket joint 13, 14 has been completed, as above stated, the recessed set screws 17 in the clamping ring 15 are released and the rings with the protective sleeve 19 and clamping ring 15 are slid to the right as viewed in FIG. 10 to abut the two sets of rings on the two segments of tubing; and the protecting sleeve segments 19 and 20 are abutted and welded circumferentially at 21 as illustrated in FIG. 11. The clamping ring 15 at the left end of the assembly in FIG. 11 is released by backing off the set screws 17, and said clamping sleeve 15 and the left hand group of rings, as illustrated in FIGS. 7-11, after the protective sleeves 19 and 20, which were applied as shown in FIG. 9, have been brought together and welded at 21 as shown in FIG. 11, and the hollow head set screws 17 in the clamping collars 15 and 16 have been tightened, the blast joint is completed.

EXAMPLE

For producing one 40 foot blast joint, the following are materials and parts in suitable form and dimensions for the production of a carbide armored blast joint:
1. Two pipe joints 2⅜ inches, each 30 foot long.
2. 480 1 inch length carbide rings = 40 feet carbide.
3. Two retainer rings with 16 hollow head set screws (made of bar stock).
4. Outer pipe over carbide rings 3¼ inches od 0.134 inch wall.
5. Radial wall thickness of carbide rings — 0.250 inch for 2⅜inches tubing.

Fabrication and Assembly

A. Two joints of production tubing — each 30 foot long.
B. Determine where to cut each for making the flush joint since, in manufacture, each end has been upset so 6 inches is allowed at each end to avoid any binding of the rings during assembly.
C. Allow clear space of 3 foot 0 inch at the box end for handling.
D. Allow 6 inches each for the space taken up by the two retainer rings.
E. Allow 6 inches from each end to avoid binding of the carbide rings during assembly.
F. On the pin end allow 6 inches for the upset in manufacture;
G. On the pin end allow 1 foot additional space for sliding the rings away to allow for wrench to tighten up the flush joint assembly; and
H. Finally allow 6 inches for the retainer ring on the pin end.

It is desirable to locate the flush joint 13, 14 nearer the pin end 3 than the box end 4 to provide greater strength to the assembly when it is raised by the box end from the horizontal to the vertical to go into the well.

To accomplish this, assume that two 30 foot lengths of productive tubing are cut as follows: one piece 19 foot 0 inch from the pin end and the other 27 foot 0 inch from the box end. The odd lengths left over are put aside. The female flush joint thread is then put in the cut end of the 19 foot 0 inch length and the male flush joint thread is put on the cut end of the 27 foot 0 inch length containing the original box end.

The outside pipe, in the above example, must be cut to the proper length so that the rings 18, 18 and outer protective pipe 19, 20 may be pushed back to expose the production tube by about 4 inches on each side of the flush joint so that the joint may be made up tight with pipe wrenches of a predetermined size.

The outer ends of the protective cover pipe sections 19, 20 embrace the stepped inner ends of the clamping rings 15 and 16 (as illustrated in Figures 9-11) with ¼ inch endwise clearance. The rings are in endwise compression — the covering pipe 19, 20 is not.

The mechanical handling of the two sections is assisted by the use of a horizontal cradle having transverse rollers allowing the tube sections to turn for threading.

The dimensions above given are exemplary and are not critical. The length of blast tubing to be provided for specific installations may vary. The practical limitation of the derrick available to place the joint may determine the length of the blast joint installed in a specific location.

The concept of utilizing the short carbide or equivalent rings is, that since the materials that are capable of being used as the abrasion resisting rings in a blast joint are of such hard and inflexible character, they are not to be bonded to the wall of the tube they protect, and they can employ the elasticity of the protecting steel tubes in a distributive manner which, by small closely spaced areas of contact, distribute the stress to the extent of avoiding fracture of the rings and thereby retaining the integrity of the rings and the entirety of the joint. To provide a degree of flexibility to an assembly of two or more rings, the meeting end faces may be formed with slightly dished and convex opposite end surfaces respectively.

As a modification of the assembly of carbide rings which are directly in contact with each other and with the clamping sleeves 15, 16 I contemplate the insertion, between said rings and said collars, of thin spring metal rings with radially extending corrugations to provide a limited degree of "give" for endwise expansion of the carbide rings.

While in the above disclosure I have specifically referred to the use of cemented tungsten carbide as the preferred wear resistant material, I do not intend, by naming it in the aforesaid specification and claims, to exclude other equivalent or suitable wear resistant materials for blast joints in an oil and/or gas well.

I claim:
1. The method of producing a blast tube for use in an oil well flow system which comprises cutting into two parts a standard length oil well production tube which has an internally threaded box joint on one end and an externally threaded pin joint on the other end to produce a first tube section and a second tube section, said first tube section having a threaded box joint on the uncut end, the second tube section having a threaded pin joint on the uncut end, cutting external pin threads to form part of a flush joint on the cut end of the first tube section, cutting internal box threads in the cut end of the second tube section, disposing a clamping collar on each of said tube sections remote from the cut ends, telescoping a set of short narrow heat and wear resistant rings axially on the first tube section leaving the internally threaded end of the first section exposed, telescoping a set of short narrow heat and wear resis- tant rings on the second tube section and leaving the externally threaded end of the second section exposed, then telescopically applying a sheath pipe section to each of said two groups of rings, then threading the two tube sections together into a flush joint, then centering the two ring sections and their clamping collars on the joint tube sections and then welding together the edges of the outer protective sheath tube sections.

2. The method of producing a carbide protective blast joint which comprises producing two sections of flow tubing with adjacent ends formed of cooperating parts of a threaded flush joint and their remote ends comprising parts of a threaded pin joint and a threaded box joint respectively, passing a longitudinally adjustable clamping ring over each of said sections to points adjacent the outer ends of said sections, sliding an array of cylindrical, square-ended carbide rings over each of the said adjacent ends, disposing a protective outer metallic sleeve endwise over each of said array of rings, then screwing the flush joint threaded parts of the two sections of flow tubing together, then moving said rings and their protective sheath sections endwise into a central compact body, and then welding the adjacent ends of the outer metallic sleeves together.

3. The method of claim 2 which comprises initially moving the clamping ring to a position adjacent the box joint to provide working space for welding the two tube sections together then welding said sections together.

4. The method of producing a blast joint in accordance with claim 3 which comprises passing a first tubular clamping sleeve with Allen head set screws therein endwise over the first tube section towards the box joint end and passing a second tubular clamping sleeve with Allen head set screws endwise over the second tube section toward the pin joint end, threading a predetermined number of square ended cylindrical carbide rings over the pin end section, then threading a predetermined number of similar carbide rings over the pin joint section, then telescoping a protective sleeve over each of said groups of rings, then threading the two tube sections together by a threaded flush joint, then bringing the two sets of rings and their protective sheaths together and welding the meeting edges of the protective sheath tubes together, then setting the set screws of the first named clamping sleeve to confine the rings and protective sheath sleeve endwise.

5. The method of producing a blast joint which comprises forming two API tube sections, one with its outer end formed as a threaded joint pin, the other with its outer end formed as a threaded box joint, forming the inner ends of said tube sections into cooperating parts of a threaded flush joint, passing a first tubular clamping sleeve with Allen head set screws endwise over the first tube section toward the pin joint end and passing a second tubular clamping sleeve with Allen head set screws endwise over the second tube section towards the box joint end, then threading a predetermined number of square ended cylindrical carbide rings over the box end section of the tube, then threading a predetermined number of similar carbide rings over the pin joint section, then telescoping separate protective sleeves over said groups of rings, then threading the two tube sections together with a flush joint, then bringing said two sets of rings and their protective sleeves together and welding the meeting edges of the protective sleeves together, then engaging the clamping sleeves against the adjacent ends of the carbide rings and setting the Allen head set screws to confine the rings and protective sheath sleeves to a predetermined location.

6. The method of producing a carbide protected blast joint of flow tubing which comprises forming two sections of flow tubing with adjacent ends formed into cooperating parts of a threaded flush joint and their remote ends into a pin joint and a box joint respectively, passing a longitudinally adjustable clamping ring over each of said sections to a point adjacent the outer ends of said sections, threading an array of cylindrical ended tungsten carbide rings over each of the said adjacent ends of flow tubing, passing a protective outer metallic sleeve endwise over each of said array of rings, then threading the flush joint threaded parts of the two sections of flow tubing together, then moving said rings and their protective metallic sheath sections endwise into a compact body and then welding the adjacent ends of the outer metallic sleeve together.

7. Method of producing a blast joint for oil well production tubing which comprises (a) producing a length of oil well production tubing having at one end an integral externally threaded pin and having at the other end an internally threaded socket, the threads of the two said parts being of the same pitch and the same diameter, (b) cutting said tubing length into two parts of approximately the same length, (c) forming on the cut end of one section an internal thread, (d) forming on the other cut end an external thread matching with the internal thread of the first section, (e) sliding over each of the adjacent ends of the cut and threaded sections a series of refractory rings, (f) joining said sections on said threaded ends and moving said rings into abutting relation with each other over said joint and (g) covering said rings with a protective tubular cover, and (h) anchoring said rings and said cover against endwise motion relative to the underlying tubing.

* * * * *